(12) United States Patent  
Kasahara et al.

(10) Patent No.: US 9,041,985 B2  
(45) Date of Patent: May 26, 2015

(54) IMAGE READING APPARATUS

(71) Applicant: PFU Limited, Kahoku-shi, Ishikawa (JP)

(72) Inventors: Yuki Kasahara, Ishikawa (JP); Masahiko Kobako, Ishikawa (JP); Masaya Takamori, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 14/186,858

(22) Filed: Feb. 21, 2014

(65) Prior Publication Data

US 2015/0092253 A1    Apr. 2, 2015

(30) Foreign Application Priority Data

Sep. 30, 2013   (JP) ................. 2013-205700

(51) Int. Cl.
*H04N 1/04*       (2006.01)
*H04N 1/028*      (2006.01)
*H04N 1/00*       (2006.01)

(52) U.S. Cl.
CPC ....... *H04N 1/02885* (2013.01); *H04N 1/02895* (2013.01); *H04N 1/00249* (2013.01); *H04N 1/00538* (2013.01); *H04N 2201/0093* (2013.01)

(58) Field of Classification Search
CPC .......... H04N 1/02885; H04N 1/02895; H04N 1/00249; H04N 1/00538; H04N 2201/0093

USPC ................... 358/475, 473; 382/313; 362/235; 235/462.46; 250/566, 237 R

See application file for complete search history.

(56) References Cited

U.S. PATENT DOCUMENTS

| | | | | |
|---|---|---|---|---|
| 5,506,394 A | * | 4/1996 | Plesko ..................... | 235/462.46 |
| 6,033,086 A | * | 3/2000 | Bohn ............................ | 362/235 |
| 6,060,722 A | * | 5/2000 | Havens et al. ................ | 250/566 |
| 6,064,062 A | * | 5/2000 | Bohn ........................ | 250/237 R |
| 6,104,845 A | * | 8/2000 | Lipman et al. ................ | 382/313 |
| 2011/0142371 A1 | | 6/2011 | King et al. | |

FOREIGN PATENT DOCUMENTS

JP     9-233265 A    9/1997
JP     2001-268323 A    9/2001

* cited by examiner

*Primary Examiner* — Houshang Safaipour
(74) *Attorney, Agent, or Firm* — McDermott Will & Emery LLP

(57) ABSTRACT

An image reading apparatus includes a casing that blocks ambient light and has an opening portion in a bottom surface, an image capturing unit that captures an image of a medium exposed to an internal portion of the casing in the opening portion, and a plurality of light sources that are arranged on the internal portion of the casing and irradiate light toward the opening portion. The plurality of light sources irradiate light to different areas on a plane in the opening portion.

7 Claims, 16 Drawing Sheets

IMAGE READING APPARATUS

CROSS-REFERENCE TO RELATED APPLICATIONS

This application is based upon and claims the benefit of priority from Japanese Patent Application No. 2013-205700, filed Sep. 30, 2013, the entire contents of which are incorporated herein by reference.

BACKGROUND OF THE INVENTION

1. Field of the Invention

The present invention relates to an image reading apparatus.

2. Description of the Related Art

There are demands for converting a medium, such as a single sheet of photo (hereinafter, single photo), which may be a silver halide photo photographed with a film camera and obtained through development and printing or a printed photo printed based on image data, or a photo album (album) composed of a plurality of photos, into image data to store and manage the image data on a recording medium such as a hard disk or a cloud computing system. Generally, the medium is read to generate the image data, with an image reading apparatus (a flatbed scanner, a scanner with an ADF (Auto Document Feeder) (hereinafter, ADF scanner), an overhead scanner, a handy scanner, and a digital camera).

In the flatbed scanner, one or more single photos or an area including at least a photo to be read in the photo album is put on a platen glass, and an image capturing unit captures, through the platen glass, the image of a surface to be read on the side of the platen glass. The ADF scanner can continuously capture images of a plurality of single photos by the image capturing unit. In the overhead scanner (see Japanese Patent Application Laid-open No. 2001-268323) or digital camera, one or more single photos or an area including at least a photo to be read in the photo album are/is arranged or placed in a photographed area of an image capturing unit. Then, the image capturing unit captures the image of a surface to be read on the side facing the image capturing unit. For the handy scanner (see U.S. Patent Application Publication No. 2011/0142371), to capture the image of the single photo or the entire area of one photo in the photo album using the image capturing unit, the handy scanner is moved while being in contact with the single photo or the photo album.

There are demands for reducing damage on the medium, easily converting the image on the medium into image data, and generating image data with high image quality. In the case of flatbed scanner, the ADF scanner, and the over head scanner, it is necessary to bring the medium to an installation place of the scanner and to arrange or devise the medium so that the image capturing unit can capture the image of the medium. For example, in the case of the ADF scanner, it is necessary to take out a photo once from the photo album, when converting the photo taken out from the photo album into image data. Particularly, in the case of a photo album in which photos are fixed with an adhesive agent, there are problems such that the photo is damaged when removing the photo, and that an adhesive force of the adhesive agent decreases due to the removal, which causes difficulty in fixing the photo again on the photo album.

In the ADF scanner, the photo is carried to the image capturing unit by a carriage roller, which results in a problem of damaging the photo. Similarly, the handy scanner has a problem of damaging the medium because the handy scanner contacts the medium.

In the handy scanner, when the single photo is converted into image data, the photo needs to be held by hand not to be moved. Because it is necessary to move the handy scanner side, the user has quite many bothersome processes to do. Further, because the user moves the handy scanner with respect to the medium, the relative speed of the medium and the handy scanner is not constant, which makes it difficult to maintain high quality of the image data generated.

The overhead scanner and the digital camera are apt to be influenced by ambient, because the photo or photo album is exposed to the ambient at the time of capturing an image of or photographing the photo or photo album. A sheet of printing paper (for a silver halide photo) or glossy paper (for a printed photo) has higher reflectivity than plain paper. Thus, ambient light irradiated onto the medium from the outside is reflected on the surface to be read of the medium, and directly enters the image capturing unit. This results in a trouble of reflection of the ambient light due to increase of reflected light of the ambient light which is incident on the image capturing unit. It is therefore difficult to maintain high quality of the image data generated.

SUMMARY OF THE INVENTION

It is an object of the present invention to at least partially solve the problems in the conventional technology.

According to an aspect of the present invention, an image reading apparatus includes a casing that blocks ambient light and has an opening portion in a bottom surface, an image capturing unit that captures an image of a medium exposed to an internal portion of the casing in the opening portion, and a plurality of light sources that are arranged on the internal portion of the casing and irradiate light toward the opening portion, wherein the plurality of light sources irradiate light to different areas on a plane in the opening portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Descriptions will now specifically be made to the present invention with reference to the drawings. The embodiments below are not to limit the present invention. Constituent elements of the embodiments below include those that can easily be devised by the skilled in the art or those that are substantially the same.

First Embodiment

Figure 1:
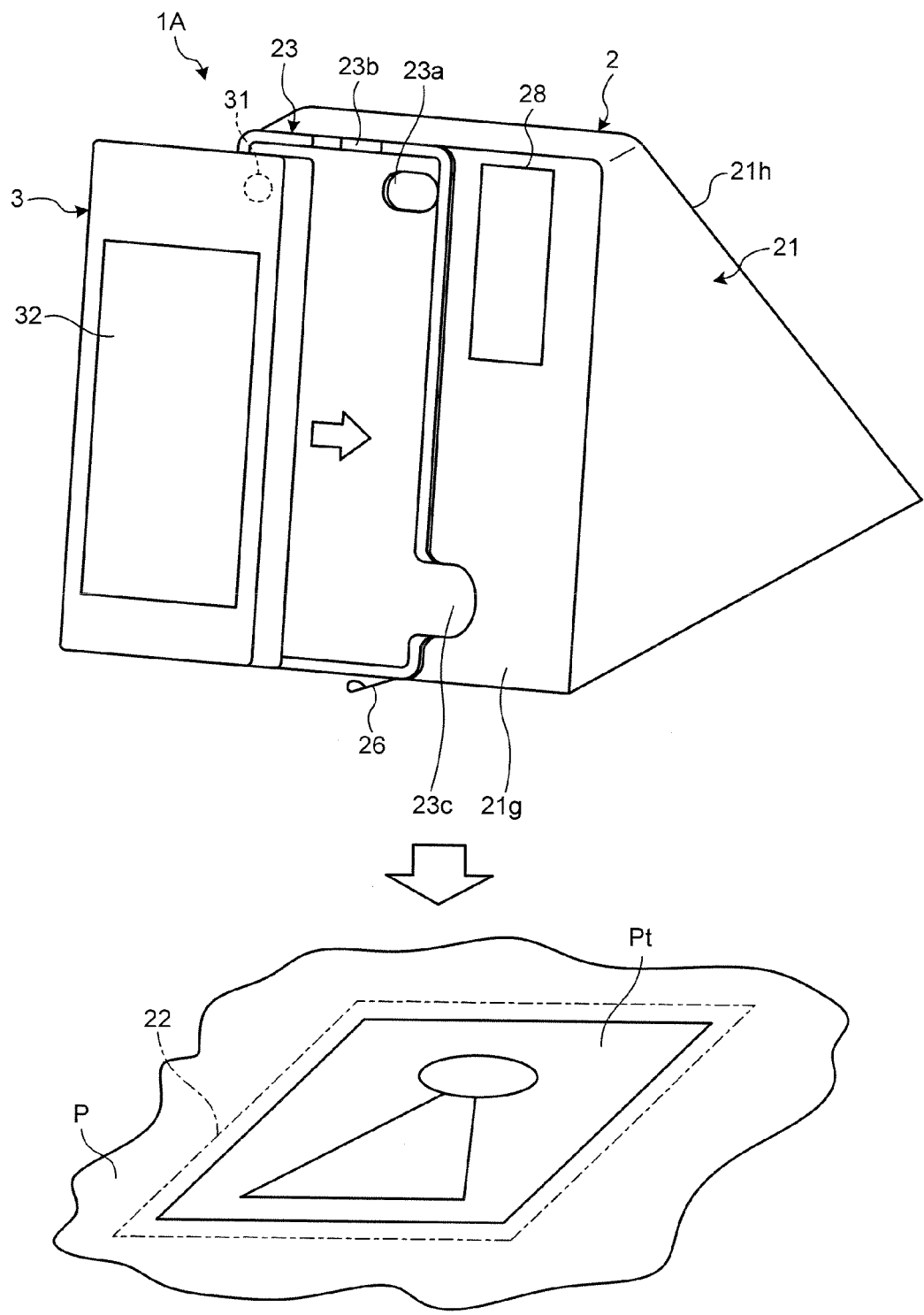
FIG. 1 is an external view of an image reading apparatus according to a first embodiment.
Figure 2:
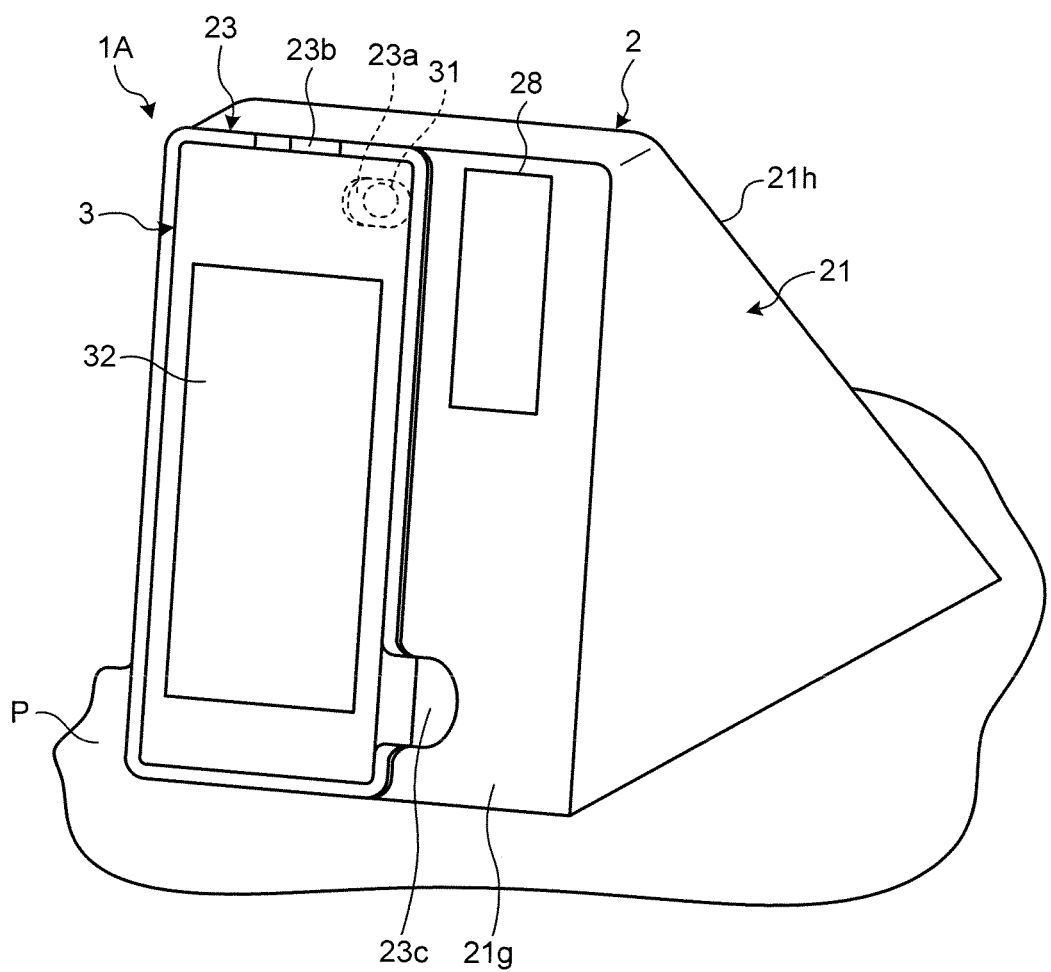
FIG. 2 is a diagram illustrating a state in which the image reading apparatus according to the first embodiment is used.
Figure 3:
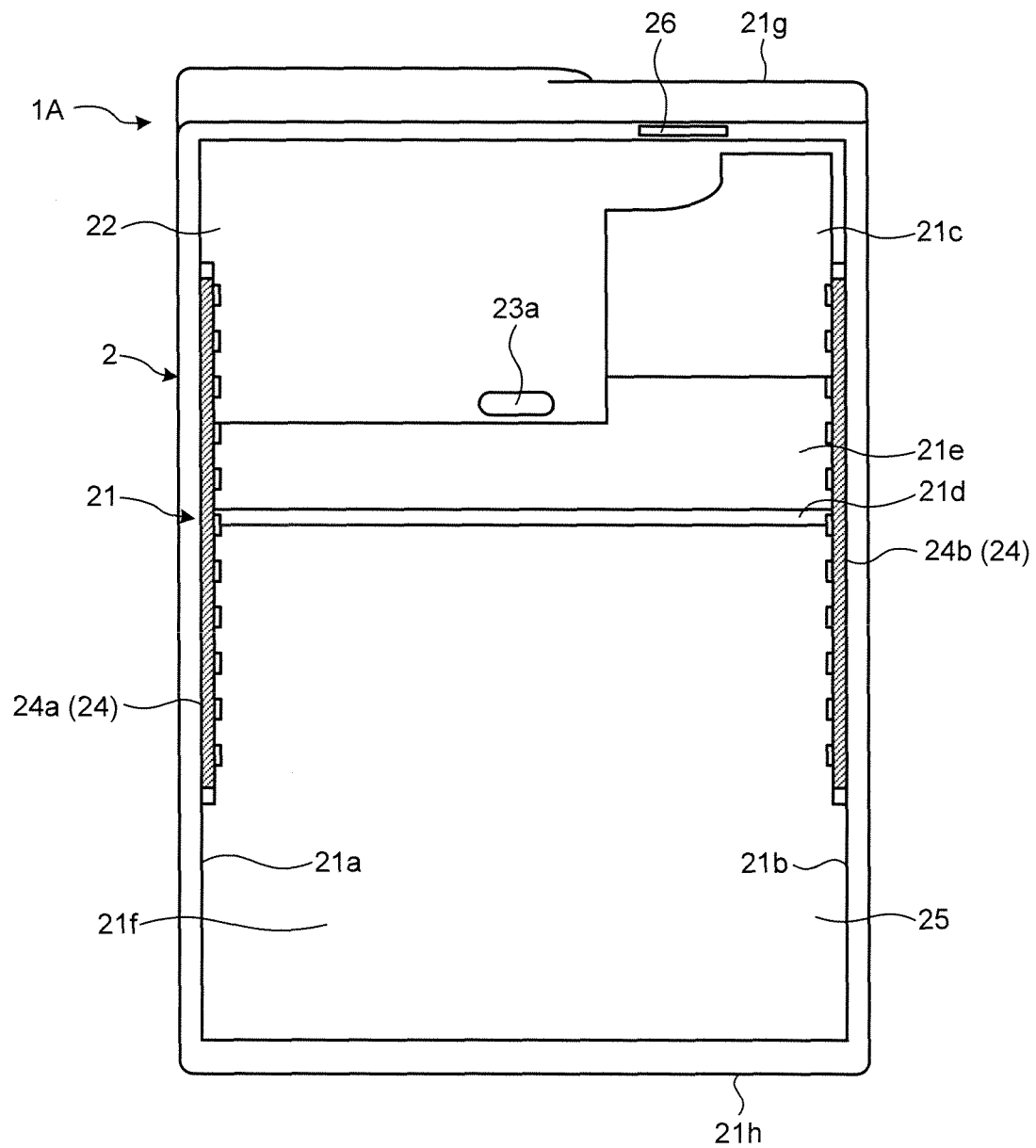
FIG. 3 is a bottom view of a casing.
Figure 4:
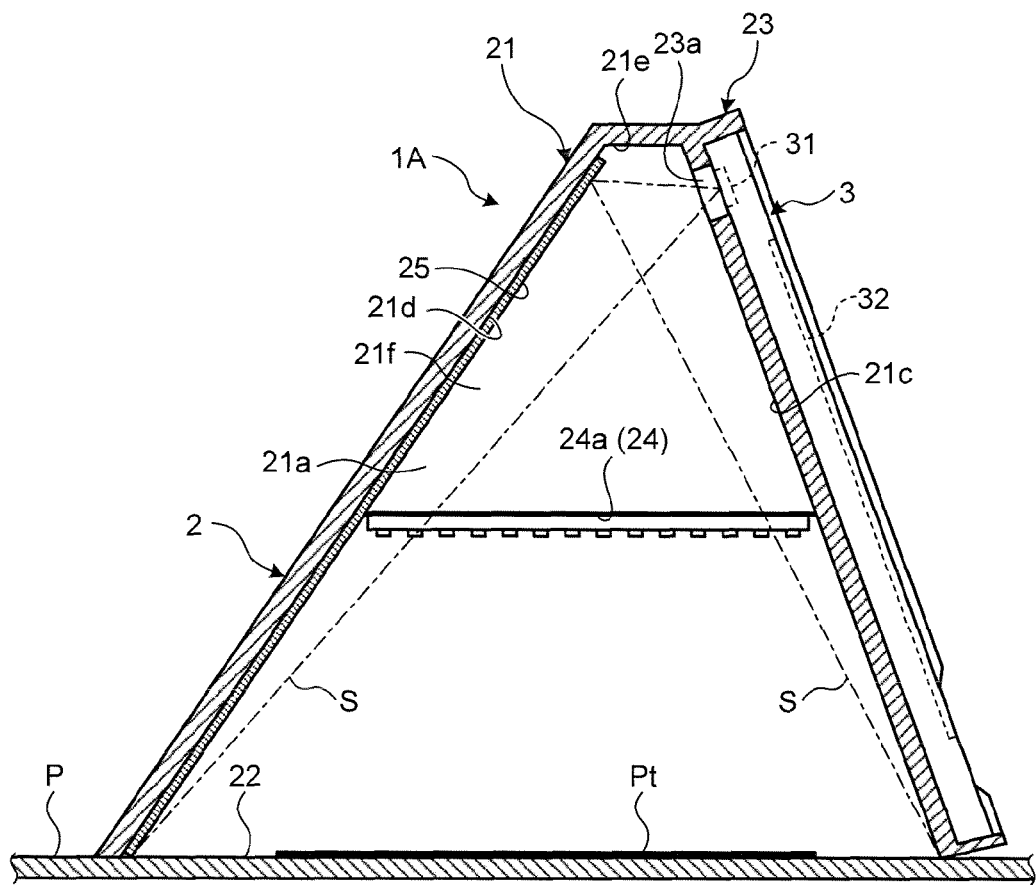
FIG. 4 is a cross sectional view of the image reading apparatus in a in-use state.
Figure 5:
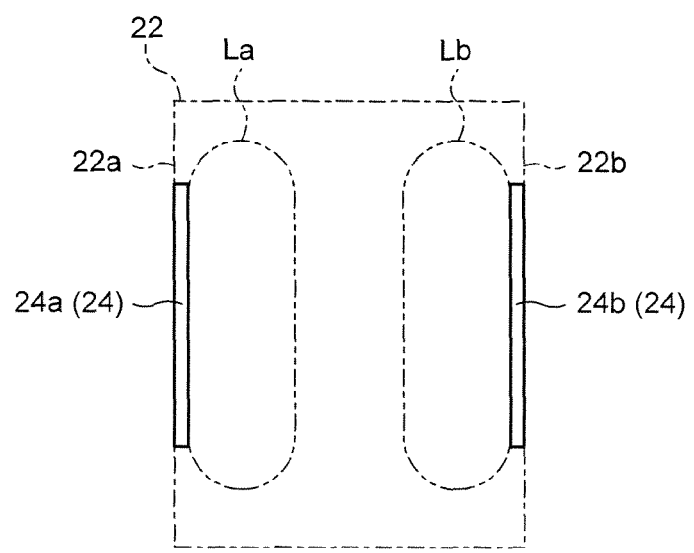
FIG. 5 is a diagram illustrating main irradiation areas.
Figure 6:
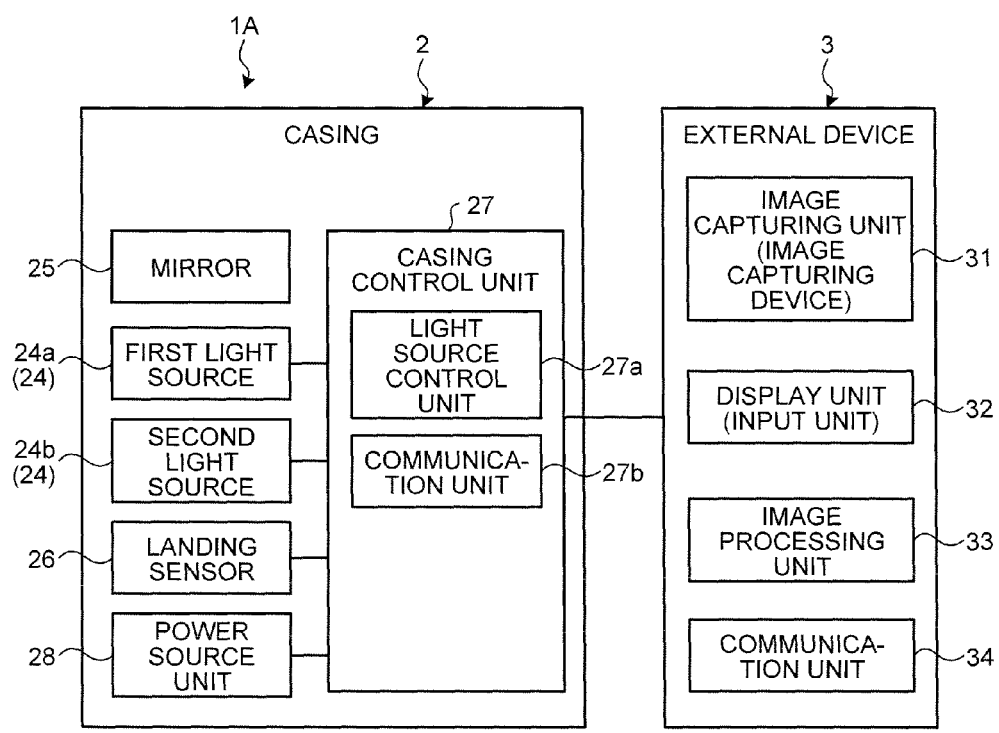
FIG. 6 is a diagram illustrating a schematic configuration example of the image reading apparatus according to the first embodiment.

FIG. 1 is an external view of an image reading apparatus according to a first embodiment. FIG. 2 is a diagram illustrating a state in which the image reading apparatus according to the first embodiment is in use (hereinafter, in-use state). FIG. 3 is a bottom view of a casing. FIG. 4 is a cross sectional view of the image reading apparatus in the in-use state. FIG. 5 is a diagram illustrating main irradiation areas. FIG. 6 is a diagram illustrating a schematic configuration example of the image reading apparatus according to the first embodiment. An image reading apparatus 1A, according to the first embodiment, has a size that can be carried by hand. As illustrated in FIG. 1 and FIG. 2, an image of a medium P is captured by an image capturing unit 31, thereby generating image data corresponding to the medium P. The image reading apparatus 1A in this embodiment regards a photo album, in which silver halide photos or printed photos are compiled, as a medium P, reads a single photo in the photo album as a target area Pt to be read (hereinafter, read-target area Pt), and generates image data corresponding to the single photo in the photo album. The intended use of the image reading apparatus 1A in this embodiment is not limited to the above. The image reading apparatus 1A can be used not only in a case of generating image data corresponding to an image on a glossy paper (such as single silver halide photo, single printed photo, or magazine), but also in a case of generating image data corresponding to an image on a plain paper, therefore, the image reading apparatus 1A can be used for whichever medium from which a user wants to generate image data.

As illustrated in FIG. 1, the image reading apparatus 1A is configured to include a casing 2 and an external device 3. As illustrated in FIG. 6, the image reading apparatus 1A is configured to further include a plurality of light sources 24, a mirror 25, a landing sensor 26, the image capturing unit 31, and a display unit 32. In the image reading apparatus 1A according to this embodiment, the casing 2 has the plurality of light sources 24, while the external device 3 has the image capturing unit 31 and the display unit 32.

The casing 2 is formed to target the external device 3 having regulated external dimensions and having the image capturing unit 31 at a regulated position, or external device 3 having external dimensions within a predetermined range and having the image capturing unit 31 at a position within a predetermined range, for example, the external devices 3 in the same series. As illustrated in FIG. 3 and FIG. 4, the casing 2 blocks the ambient light, and has an opening portion 22 on the bottom surface. The casing 2 is configured such that the external device 3 is attachable and detachable to and from the casing 2. The casing 2 is configured to include a body unit 21, the opening portion 22, a holder portion 23, the plurality of light sources 24, the mirror 25, the landing sensor 26, a casing control unit 27, and a power source unit 28.

The body unit 21 is formed of a resin material (for example, a black synthetic resin) through which ambient light does not transmit, and is box shaped with the opening portion 22 on the bottom surface. In the body unit 21, the internal space, that is, a casing internal portion 21f, is formed with a pair of opposite internal side surfaces 21a and 21b, an exposing surface 21c and an opposed surface 21d facing the exposing surface 21c to form a pair, a ceiling surface 21e, and the opening portion 22. In the casing internal portion 21f, a space between the exposing surface 21c and opposed surface 21d facing the exposing surface 21c to form a pair in the body unit 21, is formed and expands toward the opening portion 22, when viewed from the internal side surfaces 21a and 21b. That is, the casing internal portion 21f is formed in a trapezoidal shape, in which the exposing surface 21c and the opposed surface 21d are inclined surfaces. An external shape of the body unit 21 is also formed in a trapezoidal shape, with an inclined surface 21g corresponding to the exposing surface 21c and an inclined surface 21h corresponding to the opposed surface 21d, along the casing internal portion 21f.

As illustrated in FIG. 1, the opening portion 22 overlaps with a medium P, and causes the medium P to be exposed to the casing internal portion 21f, when the casing 2 covers the read-target area Pt of the medium P. The opening portion 22 in this embodiment is formed to have an area that the photo with at least a size L (89 mm*127 mm) can be fit inside the opening portion 22. In consideration of an image process as will be described later, the opening portion 22 preferably has an area that some space is formed between the outer edge of the opening portion 22 and the outer edge of the photo (for example, 102 mm*140 mm), in a state where the center of L-sized photo coincides with the center of the opening portion 22. The opening portion 22 does not have a material that intercepts the contact between the casing internal portion 21f and the external portion.

The holder portion 23 is to accommodate the external device 3, and is formed outside the casing 2. The holder portion 23 in this embodiment is a frame member that can accommodate the external device 3 inside thereof, and is formed on the inclined surface 21g. The holder portion 23 is formed to have a space with respect to the accommodated external device 3, and the accommodated external device 3 can be detached therefrom. Thus, the image capturing unit 31 and the display unit 32 are installed on the external device 3 which is different from the casing 2, and are attachable/detachable to/from the casing 2. Because the holder portion 23 is formed on the inclined surface 21g, the external device 3 can be positioned with respect to the casing 2, on the basis of the bottom portion of the accommodated external device 3. The holder portion 23 has an opening portion 23a for capturing the image. As capturing the image is a through hole penetrating from the inclined surface 21g to the exposing surface 21c, and is formed in a position facing the image capturing unit 31 of the external device 3 accommodated in the holder portion 23. That is, the exposing surface 21c of the casing 2 can cause the image capturing unit 31 of the external device 3 to be exposed to the casing internal portion 21f. In the holder portion 23, a cutout portion 23b and a finger hole portion 23c which communicates to a space for accommodating the external device 3 are formed. The cutout portion 23b and the finger hole portion 23c can cause the peripheral surface of the external device 3 to be exposed to outside of the holder portion 23, in a state where the external device 3 is accommodated in the holder portion 23. Therefore, the user can contact the external device 3 from at least one of the cutout portion 23b or the finger hole portion 23c, which facilitates to detach the external device 3 from the holder portion 23.

As illustrated in FIG. 4, the plurality of light sources 24 are arranged in the casing internal portion 21f, and irradiate light onto the opening portion 22. The plurality of light sources 24 in this embodiment are two light sources that are a first light source 24a and a second light source 24b. The first light source 24a and the second light source 24b are light emitting modules in which a plurality of light emitting devices such as LED and LD are arranged in a strip, and are turned on by electric power from the power source unit 28. The first light source 24a and the second light source 24b are arranged respectively on the internal side surfaces 21a and 21b. The first light source 24a and the second light source 24b have a sufficient amount of light to capture the image of the entire area of the medium P (area including the read-target area Pt) which is exposed from the opening portion 22 to the casing internal portion 21f. The first light source 24a and the second light source 24b irradiate light onto different areas on a plane in the opening portion 22. The first light source 24a has an optical axis on the side of the internal side surface 21a of the opening portion 22. The second light source 24b has an optical axis on the side of the internal side surface 21b of the opening portion 22. The first light source 24a and the second light source 24b respectively have main irradiation areas La and Lb on a pair of opposed sides of the plane in the opening portion 22, that is, on a side 22a corresponding to the internal side surface 21a and on a side 22b corresponding to the internal side surface 21b. As a result, the first light source 24a and the second light source 24b irradiate light in a manner that the main irradiation areas La and Lb do not overlap with each other on the plane in the opening portion 22. Note that the main irradiation areas La and Lb are areas onto which, among the light from the first light source 24a and the second light source 24b, the light which is reflected on the medium P and directly incident on the image capturing unit 31, is irradiated. Specifically, in this embodiment, light which is incident on the image capturing unit 31 through the mirror 25 is irradiated. These areas are also defined as areas where lights from the first light source 24a and the second light source 24b reflected on the medium P are superposed on the image data generated, resulting in areas where identification of an image of the medium P is impossible due to superposition of the lights reflected.

The mirror 25 is to capture the image of the medium P exposed to the casing internal portion 21f in the opening portion 22, using the image capturing unit 31. As illustrated in FIG. 4, the mirror 25 is provided on the opposed surface 21d facing the exposing surface 21c where the image capturing unit 31 is exposed. The positional relationship (including the angle to the plane in the opening portion 22) among the image capturing unit 31, the mirror 25, and the opening portion 22 is set that an image-capturing area S (see dashed lines in FIG. 4) of the image capturing unit 31 through the mirror 25 is equal to or wider than the area of the opening portion 22. That is, the image capturing unit 31 can capture an image of the entire area of the medium P exposed to the casing internal portion 21f in the opening portion 22. Because the image capturing unit 31 captures the image of the medium P through the mirror 25, the position of the image capturing unit 31 with respect to the opening portion 22 is not determined uniquely by the image-capturing area of the image capturing unit 31. Thus, the position of the image capturing unit 31 in the casing 2 can arbitrarily be determined, enabling to suppress the size of the casing 2. Because the accommodating position of the external device 3 with respect to the casing 2 can arbitrarily be determined, the holder portion 23 for accommodating the external device 3 can be formed in a position in consideration of smooth attachment/detachment of the external device 3 to/from the casing 2.

The landing sensor 26 is a blockade detection unit, and detects that the opening portion 22 has been blocked. As illustrated in FIG. 1 and FIG. 3, the landing sensor 26 in this embodiment is provided on the bottom surface of the casing 2. The landing sensor 26 is a mechanical sensor which is ON upon deformation of the arm by the medium P, when the bottom surface of the casing 2 closely contacts the medium P, that is, when the opening portion 22 is blocked by the medium P.

As illustrated in FIG. 6, the casing control unit 27 is to control each of the units included in the casing 2, and includes a light source control unit 27a and a communication unit 27b. The light source control unit 27a is to control turning on of the plurality of light sources 24, and can control the amount of light and timing to turn on the first light source 24a and the second light source 24b. The light source control unit 27a in this embodiment turns on the first light source 24a and the second light source 24b at the same time, when the landing sensor 26 detects that the opening portion 22 has been blocked. The light source control unit 27a may turn off the first light source 24a and the second light source 24b at the same time, when a predetermined period of time has elapsed since the first light source 24a and the second light source 24b are turned on at the same time. Based on a light source switching signal from the external device 3, the light source control unit 27a turns on only the first light source 24a, turns on only the second light source 24b after turning off the first light source 24a, and then turns off the second light source 24b. The communication unit 27b is to electrically connect the casing 2 to the external device 3, and sends/receives information to/from a communication unit 34. In this case, the communication unit 27b and the communication unit 34 sends/receives information through radio wave wireless communication by radio waves or optical wireless communication based on the light color or lighting pattern.

As illustrated in FIG. 6, the power source unit 28 is to supply electric power to each of the units included in the casing 2, that is, to the plurality of light sources 24 and the casing control unit 27. The power source unit 28 in this embodiment is a primary battery or a secondary battery.

The external device 3 is an independent unit from the casing 2. In the external device 3, a reading application corresponding to a function as the image reading apparatus 1A is installed in advance, or is installed by reading (including downloading) it from a recording medium. The external device 3 in this embodiment is a mobile terminal such as a smartphone or tablet, which has a function as the image reading apparatus 1A, as one of its functions, and other functions, such as a telephone function and an Internet connection function. As illustrated in FIG. 1 and FIG. 6, the external device 3 is configured to include the image capturing unit 31, the display unit 32, an image processing unit 33, the communication unit 34, a power source unit which is not illustrated, and a storage unit which is not illustrated.

As illustrated in FIG. 4, the image capturing unit 31 is for capturing the image of the medium P exposed to the casing internal portion 21f in the opening portion 22. The image capturing unit 31 is arranged on the back surface (surface opposed to the surface on which the display unit 32 is provided) of the external device 3, and includes imaging devices (CCD image sensor or CMOS image sensor driven by electric power from the power source unit) which are arranged in a planar form. Each of the imaging devices outputs an image signal based on an output value corresponding to incident light, to the image processing unit 33, at each exposure. That is, the image capturing unit 31 is provided to capture the image of the medium P at once using the imaging devices arranged in a planar form. The image capturing unit 31 performs imaging controls, such as exposure timing or exposure time of each of the imaging devices. When the plurality of light sources 24 turn on, the image capturing unit 31 exposes each imaging device. The image capturing unit 31 in this embodiment continues to capture the image of the medium P when the first light source 24a and the second light source 24b in the simultaneous turning-on state. The image capturing unit 31 captures one image of the medium P at a time, each time when the respective one of the first light source 24a and the second light source 24b turns on, at the time of turning on only the first light source 24a and at the time of turning on only the second light source 24b. That is, at each time of capturing the image using the image capturing unit 31, out of the plurality of light sources 24 the light source (only the second light source 24b), which is different from the light source (only the first light source 24a) having been turned on at the time of capturing the image previously, is turned on.

As illustrated in FIG. 1, the display unit 32 displays image of the medium P captured by the image capturing unit 31. The display unit 32 is arranged on the surface of the external device 3, and is a display, such as liquid crystal display and an organic EL display which are driven by electric power from the power source unit. The display unit 32 displays an image (image corresponding to the medium P when the medium P is exposed to the casing internal portion 21f in the opening portion 22) captured by the image capturing unit 31, based on an image data signal output from the image processing unit 33. The display unit 32 in this embodiment is a touch-panel display having not only a function as an output unit of the external device 3, but also a function as an input unit. If a user presses an arbitrary position, an electric signal corresponding to the position is output to each of the units configuring the external device 3. When the reading application is executed, the display unit 32 displays a shutter in the form of an icon, and when the user presses the shutter, an imaging instruction signal for instructing the image capturing unit 31 to perform capturing the image is output to the image capturing unit 31, and the image capturing unit 31 performs capturing the image.

Figure 7:
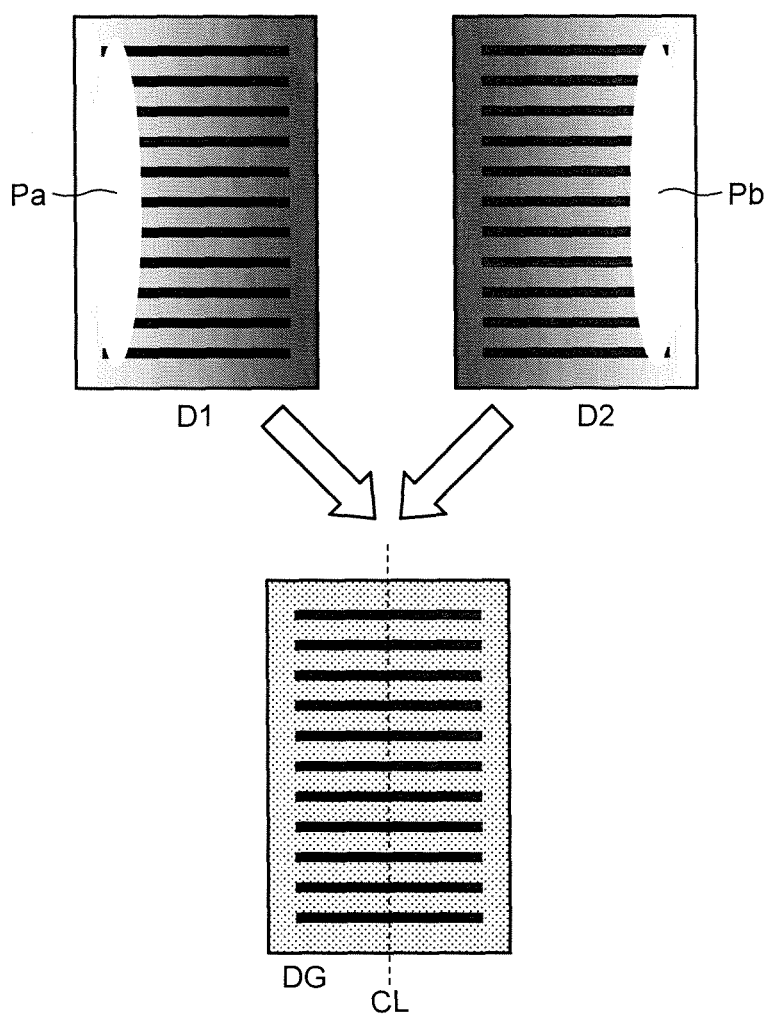
FIG. 7 is a diagram illustrating synthesized image data.

The image processing unit 33 is to process image data corresponding to the image of the medium P captured by the image capturing unit 31. The image processing unit 33 captures the image of the opening portion 22 and generates image data, based on an image signal output from the image capturing unit 31. If the opening portion 22 is blocked by the medium P, image data corresponding to the medium P is generated. As illustrated in FIG. 7, the image processing unit 33 generates image data (synthetic image data DG) which is obtained by synthesizing image data (first image data D1) captured and generated by the image capturing unit 31 at the turning on of only the first light source 24a with image data (second image data D2) captured and generated by the image capturing unit 31 at the turning on of only the second light source 24b. Because the first image data D1 is one which has been captured at the turning on of only the first light source 24a, reflection Pa of the first light source 24a occurs in an area corresponding to the main irradiation area La, thus not enabling to identify an image in the area of the corresponding medium P. Because the second image data D2 is one which has been imaged at the turning on of only the second light source 24b, reflection Pb of the second light source 24b occurs in an area corresponding to the main irradiation area Lb, thus not enabling to identify an image in the area of the corresponding medium P. The reflections Pa and Pb occur in different positions of the image data. This is because the first light source 24a and the second light source 24b irradiate light to different areas on the planar surface in the opening portion 22. Accordingly, in the first image data D1, it is possible to identify an image in the area of the corresponding medium P in the area of the reflection Pb. On the other hand, in the second image data D2, it is possible to identify an image in the area of the corresponding medium P in the area of the reflection Pa. The image processing unit 33 extracts an area in which the image in the area of the medium P can be identified to generate the synthetic image data DG, from the both image data D1 and D2. The image processing unit 33 in this embodiment sets a center line CL, as a boundary, of the both image data D1 and D2 positioned between the both reflections Pa and Pb, out of the both image data D1 and D2. The image processing unit 33 extracts an area on the opposite side to the side of the reflection Pa across the center line CL, of the first image data D1, extracts an area on the opposite side to the side of the reflection Pb across the center line CL, of the second image data D2, and synthesizes the image data corresponding to the extracted two areas, thereby generating the synthetic image data DG. That is, the synthetic image data DG to be generated is composed of only high quality image area out of the both image data D1 and D2. The image processing unit 33 performs various corrections for the synthetic image data DG. The corrections include, as will be described later, smoothing of the boundary, mirror reversal correction, trapezoid correction, rectangular cropping, and gamma correction.

The communication unit 34 is to electrically connect the external device 3 to the casing 2, and sends/receives information to/from the communication unit 27b. The communication unit 34 in this embodiment outputs a light source switching signal to the communication unit 27b.

Figure 8:
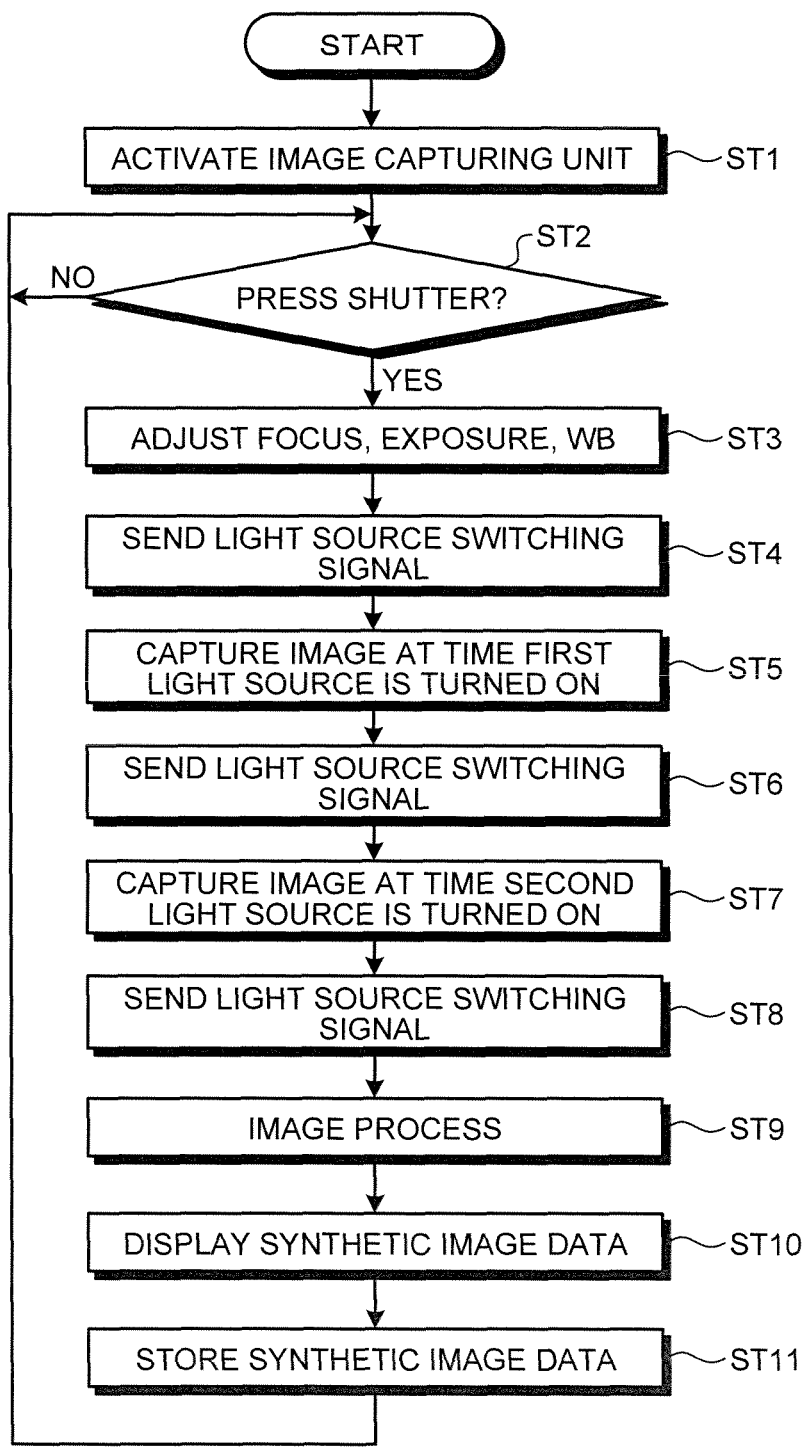
FIG. 8 is a flowchart of a reading operation of the image reading apparatus according to the first embodiment.
Figure 9:
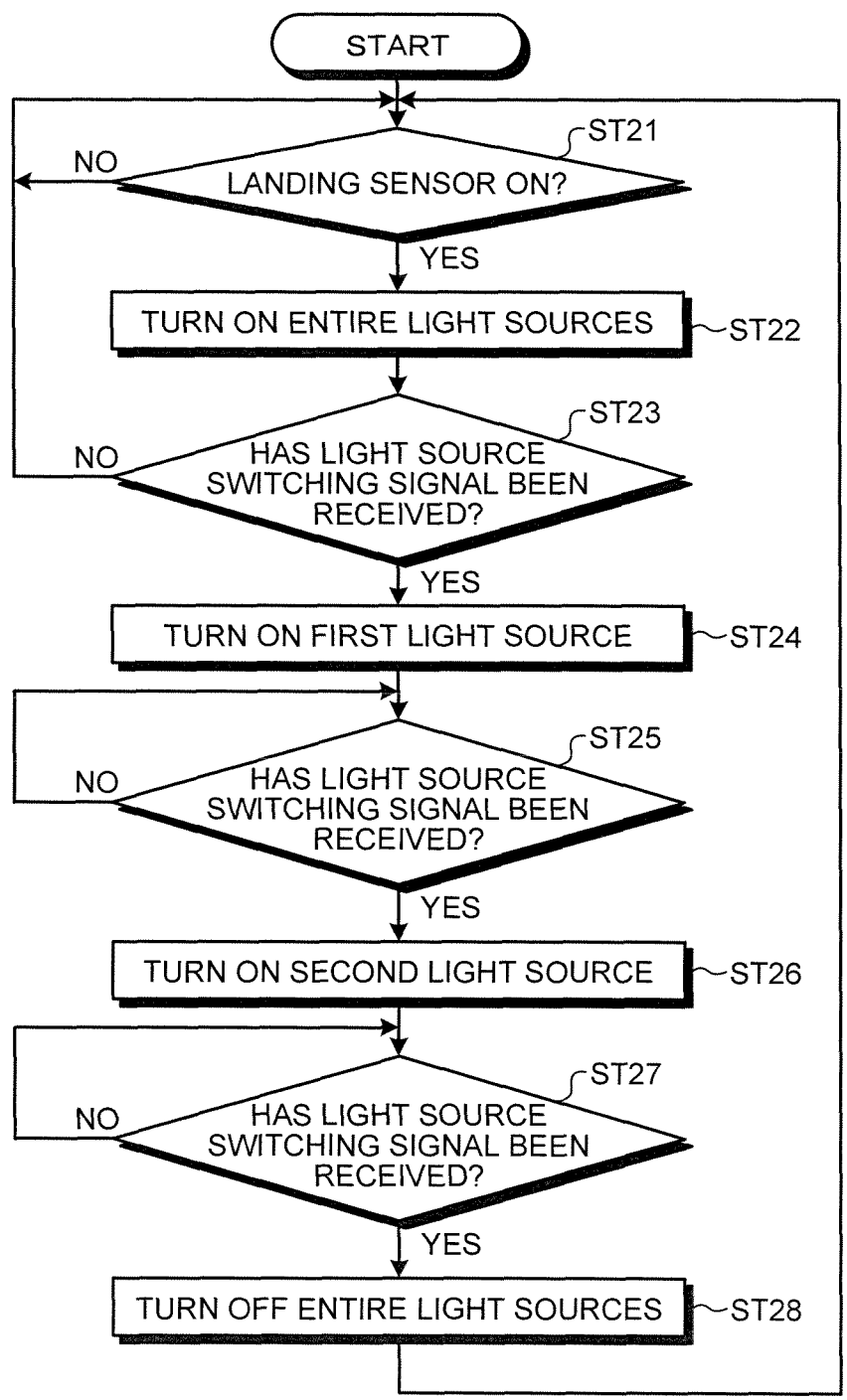
FIG. 9 is a flowchart of a reading operation of the image reading apparatus according to the first embodiment.
Figure 10:
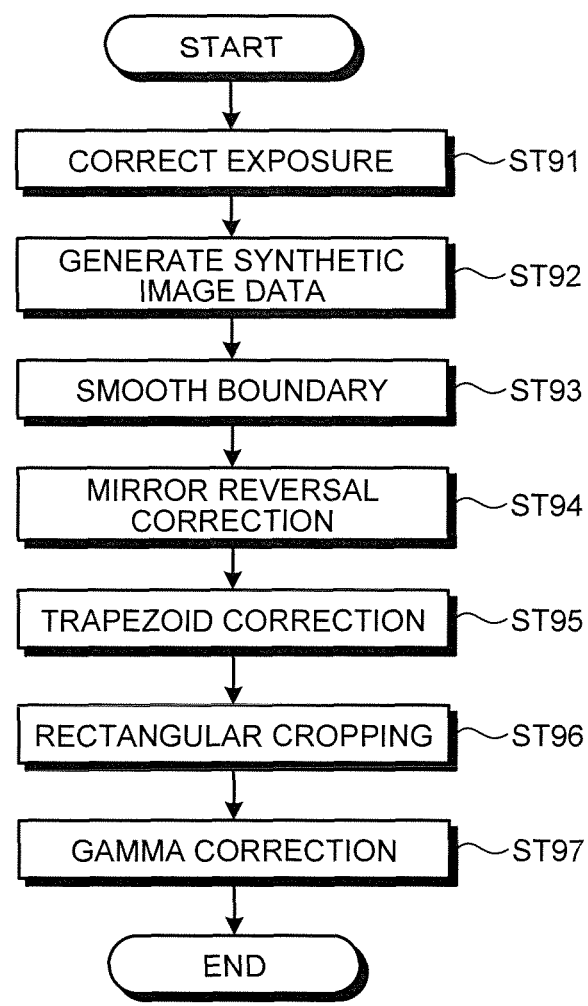
FIG. 10 is a flowchart of a reading operation of the image reading apparatus according to the first embodiment.

Descriptions will now be made to the reading of the medium P, as performed by the image forming apparatus 1A according to this embodiment. FIG. 7 is a diagram illustrating synthetic image data. FIG. 8 is a flowchart of a reading operation of the image reading apparatus according to the first embodiment. FIG. 9 is a flowchart of a reading operation of the image reading apparatus according to the first embodiment. FIG. 10 is a flowchart of a reading operation of the image reading apparatus according to the first embodiment. The reading of the medium P is performed by the image forming apparatus 1A in a state where the external device 3 is attached to the casing 2. As illustrated in FIG. 8, the external device 3 activates the image capturing unit 31, based on a user instruction for executing the reading application of the external device 3 (Step ST1). The instruction for executing the reading application is performed by, for example, the user operating the touch panel of the display unit 32, displaying an icon of an activation button corresponding to the reading application on the display unit 32, and pressing the activation button. As a result, the image capturing unit 31 is activated, to continue capturing image of the opening portion 22. Then, image signals are sequentially output to the image processing unit 33. The image processing unit 33 sequentially generates image data, and images based on the generated image data are sequentially displayed by the display unit 32. At this time, the display unit 32 displays the image together with the shutter in the form of an icon. The external device 3 repeats to determine whether the shutter has been pressed (Step ST2) until the shutter is pressed, and stands by until the shutter is pressed.

The user checks the medium P to be read, and positions the image forming apparatus 1A for the medium P by hand, in a manner that the opening portion 22 is opposed to the read-target area Pt, of the medium P. At this time, the plurality of light sources 24 are in a turned off state. The casing control unit 27 repeats to determine whether the landing sensor 26 is ON, as illustrated in FIG. 9, (Step ST21), until the landing sensor 26 is ON, and stands by until the ground sensor is ON.

As illustrated in FIG. 2, the user lowers the image forming apparatus 1A toward the medium P to closely contact the casing 2 to the medium P (when the medium P is smaller than the opening portion 22, the casing 2 is closely contacted to the surface on which the medium P is put). At this time, the plurality of light sources 24 are in a turned-off state, the casing internal portion 21f is in complete darkness and the image of the medium P for blocking the opening portion 22 is sequentially captured by the image capturing unit 31. However, it is not possible to identify the images in the read-target area Pt, of the corresponding medium P in the sequentially generated images. Thus, even in the image based on the image data sequentially displayed on the display unit 32, it is not possible to identify the image in the read-target area Pt. On the other hand, the landing sensor 26 is ON, because the casing 2 is closely contacted to the medium P, causing to block the opening portion 22. Thus, as illustrated in FIG. 9, the casing control unit 27 determines that the landing sensor is ON (Step ST21 Yes), to turn on the entire light sources (Step ST22). In this case, the light source control unit 27a turns on all of the plurality of light sources 24, when the landing sensor 26 detects that the opening portion 22 is blocked. As a result, the light is irradiated from the plurality of light sources 24 to the casing internal portion 21f, the light is irradiated directly or through the mirror 25 from the plurality of light sources 24 to the medium P blocking the opening portion 22. That is, the display unit 32 displays images that are captured by the image capturing unit 31, when the plurality of light sources 24 are in a turned-on state. If the image of the medium P blocking the opening portion 22 is sequentially captured by the image capturing unit 31, it is possible to identify the image in the read-target area Pt, of the corresponding medium P in the sequentially generated images. It is possible to identify the image in the read-target area Pt, in the image based on the image data displayed sequentially on the display unit 32. As a result, the user can adjust the positional relationship between the medium P and the opening portion 22, based on the image displayed on the display unit 32, and keep the read-target area Pt within the opening portion 22. In the image data, the reflections Pa and Pb occur. However, the positional relationship between the medium P and the opening portion 22 can be identified. As illustrated in FIG. 9, the light source control unit 27a repeats to determine whether a light source switching signal has been received (Step ST23), until a first light source turning-on signal (described later) is received, and stands by until the first light source turning-on signal is received.

As illustrated in FIG. 8, when the user presses the shutter of the display unit 32, the external device 3 determines that the shutter has been pressed (Step ST2 Yes), and adjusts the focus, exposure, and white balance (WB) (Step ST3). In this case, the image capturing unit 31 sets an imaging condition of the image capturing unit 31 in conformity with an environment of the casing internal portion 21f, thereby performing the above adjustments to attain the ideal image quality for the area opposed to the occurrence sides of the reflections Pa and Pb, of the both image data D1 and D2, especially.

As illustrated in FIG. 8, the external device 3 sends a light source switching signal (Step ST4). The external device 3 sends a first light source turning-on signal, as a light source switching signal, for turning on only the first light source 24a, to the light source control unit 27a of the casing 2 through the communication unit 34 and the communication unit 27b. As a result, as illustrated in FIG. 9, the light source control unit 27a receives the first light source turning-on signal (Step ST23 Yes), and turns on only the first light source 24a based on the first light source turning-on signal (Step S24).

As illustrated in FIG. 8, the external device 3 performs capturing image using the image capturing unit 31 at the time of turning on only the first light source 24a (Step ST5). The image processing unit 33 generates first image data D1 with the reflection Pa corresponding to the first light source 24a. At the generation, the display unit 32 may display an image based on the first image data D1. As illustrated in FIG. 9, the light source control unit 27a repeats to determine whether the light source switching signal has been received (Step ST25) until a second light source turning-on signal (described later) is received, stands by until the second light source turning-on signal is received, and keeps turning on the first light source 24a.

As illustrated in FIG. 8, the external device 3 sends a light source switching signal (Step ST6). In this case, the external device 3 sends a second light source turning-on signal as a light source switching signal, for turning on only the second light source 24b, to the light source control unit 27a. As a result, as illustrated in FIG. 9, the second light source turning-on signal is received (Step ST25 Yes), turns off the first light source 24a based on the second light source turning-on signal, and turns on only the second light source 24b (Step ST26).

As illustrated in FIG. 8, the external device 3 performs the capturing image using the image capturing unit 31, at the time of turning on only the second light source 24b (Step ST7). Then, the image processing unit 33 generates second image data D2 with the reflection Pb corresponding to the second light source 24b. At the generation, the display unit 32 may display an image based on the second image data D2. As illustrated in FIG. 9, the light source control unit 27a repeats to determine whether the light source switching signal has been received (Step ST27) until an entire light source turning-off signal (described later) is received, stands by until the entire light source turning-off signal is received, and keeps turning on the second light source 24b.

As illustrated in FIG. 8, the external device 3 sends a light source switching signal (Step ST8). The external device 3 sends an entire light source turning-off signal as a light source switching signal for turning off the second light source 24b, to the light source control unit 27a. As a result, as illustrated in FIG. 9, the light source control unit 27a receives the entire light source turning-off signal (Step ST27 Yes), turns off the second light source 24b based on the entire light source turning-off signal, and turns off all of the plurality of light sources 24 (Step ST28).

The external device 3 performs an image process (Step ST9). In this case, the image processing unit 33 mainly performs the generation of synthetic image data DG and correction of the synthetic image data DG. As illustrated in FIG. 10, the image processing unit 33 corrects the exposure of the image data (Step ST91). The image processing unit 33 corrects the exposure of at least one of the image data D1 and D2, to lower the difference of brightness and darkness between the both image data D1 and D2. As a result, it is possible to restrain the difference of brightness and darkness, across the center line CL in the synthetic image data DG generated with the both image data D1 and D2.

The external device 3 generates the synthetic image data DG (Step ST92). In this case, as described above and as illustrated in FIG. 7, the image processing unit 33 generates the synthetic image data DG using the both image data D1 and D2.

As illustrated in FIG. 10, the external device 3 performs smoothing of the boundary (Step ST93). As illustrated in FIG. 7, the image processing unit 33 executes at least one well-known smoothing process, such as a rectangular synthesizing process and a feathering process, for image data in the boundary of the synthetic image data DG (that is in the vicinity of the center line CL), to perform the smoothing in the vicinity of the center line CL. As a result, it is possible to restrain that the synthetic image data DG is identified as one generated by synthesizing the two image data D1 and D2, across the center line CL of the synthetic image data DG.

The external device 3 performs mirror reversal correction (Step ST94). For the image capturing unit 31 to capture the image of the medium P from the opening portion 22 through the mirror 25, the image data generated by the image processing unit 33 is based on a mirror image which is turned upside down. The image processing unit 33 performs well-known mirror reversal correction, to turn the synthetic image data DG upside down.

The external device 3 performs trapezoid correction (Step ST95). Because the image of the medium P is captured using the image capturing unit 31 from the opening portion 22 through the mirror 25, even if the opening portion 22 is rectangular, the opening portion 22 is seen in the form of a trapezoid in the image capturing unit 31. Thus, in the image data generated by the image processing unit 33, an image which is rectangular on the medium P is in a trapezoid shape. Therefore, the image processing unit 33 sets, for example, a deformation amount of an image corresponding to the image data for the image on the medium P, based on the positional relationship between the image capturing unit 31, the mirror 25, and the opening portion 22, and performs well-known trapezoid correction based on the deformation amount.

The external device 3 performs rectangular cropping (Step ST96). In this case, the image processing unit 33 performs well-known rectangular cropping, for enabling to extract an area corresponding to the read-target area Pt in the synthetic image data DG, based on, for example, a difference of brightness and darkness in the area corresponding to the read-target area Pt and another area. As a result, the image processing unit 33 generates synthetic image data DG which is composed of only the area corresponding to the read-target area Pt.

The external device 3 performs gamma correction (Step ST97). The image processing unit 33 performs well-known gamma correction in conformity with characteristics of the display unit 32 or characteristics of a standard display unit, for the synthetic image data DG.

The external device 3 displays an image based on the synthetic image data DG, on the display unit 32 (Step ST10). The external device 3 in this embodiment displays an image based on the synthetic image data DG for which various processes have been performed.

The external device 3 stores synthetic image data DG (Step ST11). The external device 3 in this embodiment stores the synthetic image data DG after various processes have been performed, in the storage unit.

The external device is accommodated in a storage unit which is not illustrated. Determination of necessity or non-necessity of the execution and various settings of the above described smoothing of the boundary, each correction, and rectangular cropping are preferably performed using the reading application by operating an icon displayed on the display unit 32. It is preferred that the user instruct to store the synthetic image data DG in the storage unit, by operating an icon displayed on the display unit 32 by the reading application.

Accordingly, the image reading apparatus 1A according to this embodiment captures the image of the medium P exposed to the casing internal portion 21f in the opening portion 22. Thus, the medium P is not carried, and the image capturing unit 31 does not move in contact with the medium P, thus reducing damage on the medium P. The image reading apparatus 1A is put on the medium P by hand, thereby simply generating the image data (first image data D1, second image data D2, and synthetic image data DG). Because the image data can be generated by moving the image reading apparatus 1A side to the medium P, the medium P can easily be converted to image data. The casing 2 is closely contacted to the medium P, thereby enabling to block the ambient light irradiated to the casing internal portion 21f. Thus, the image capturing unit 31 can capture the image of the medium P with only the light from the plurality of light sources 24, thus preventing to lower the image quality due to some disturbance and generating high quality image data.

At each time of capturing the image using the image capturing unit 31, light is irradiated to different areas (main irradiation areas La and Lb) on the plane in the opening portion 22. Thus, the reflections (reflections Pa and Pb) do not occur in the same area in each generated image data (first image data D1 and second image data D2). The synthetic image data DG is generated by extracting areas without the reflection, from each image data. This enables to remove any areas with the reflection, from the image data. As a result, the synthetic image data is composed of only areas with high quality image, of the image data, thereby enabling to generate high quality image data.

The external device 3 is attachable/detachable to/from the casing 2, and thus the image capturing unit 31 and the display unit 32 can be detached from the casing 2. Therefore, the image reading apparatus 1A can be configured using the existing external device 3 owned by the user, without installing the image capturing unit 31 and the display unit 32 on the side of the casing 2. As a result, the configuration of the casing 2 can be simplified, thus lowering the manufacturing cost of the casing 2. Because the casing 2 does not have the image capturing unit 31 and the display unit 32 as electronic components, it is possible to lower the occurrence of a fault or the like and to improve the durability.

Second Embodiment

Figure 11:
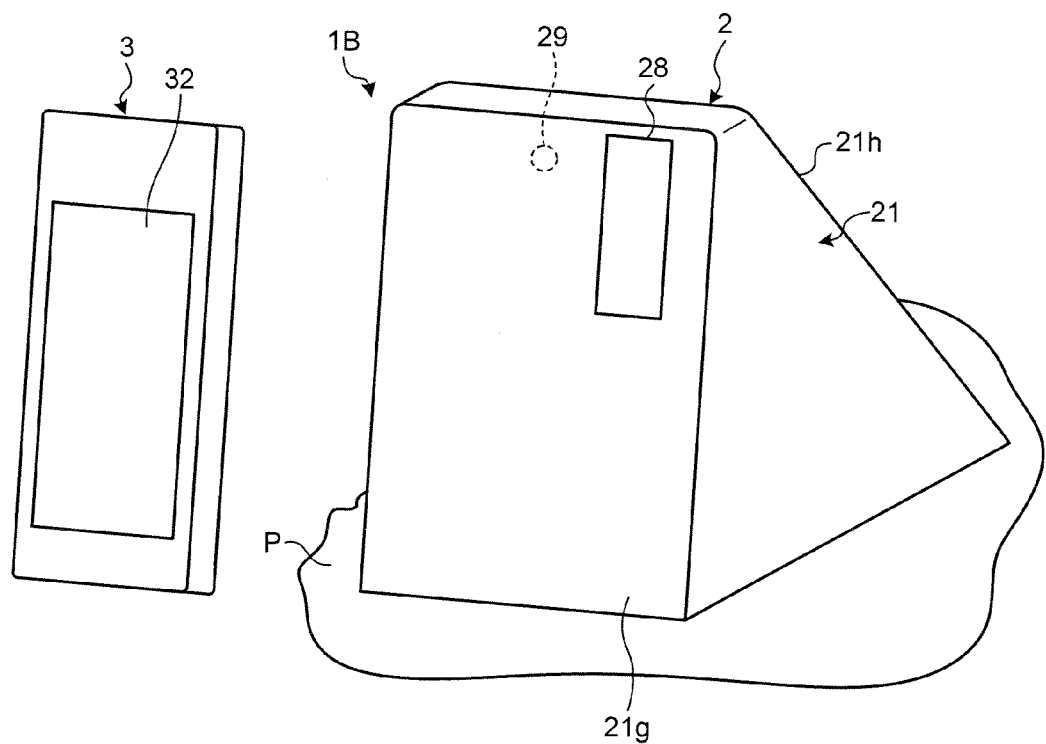
FIG. 11 is an external view of an image reading apparatus according to a second embodiment.
Figure 12:
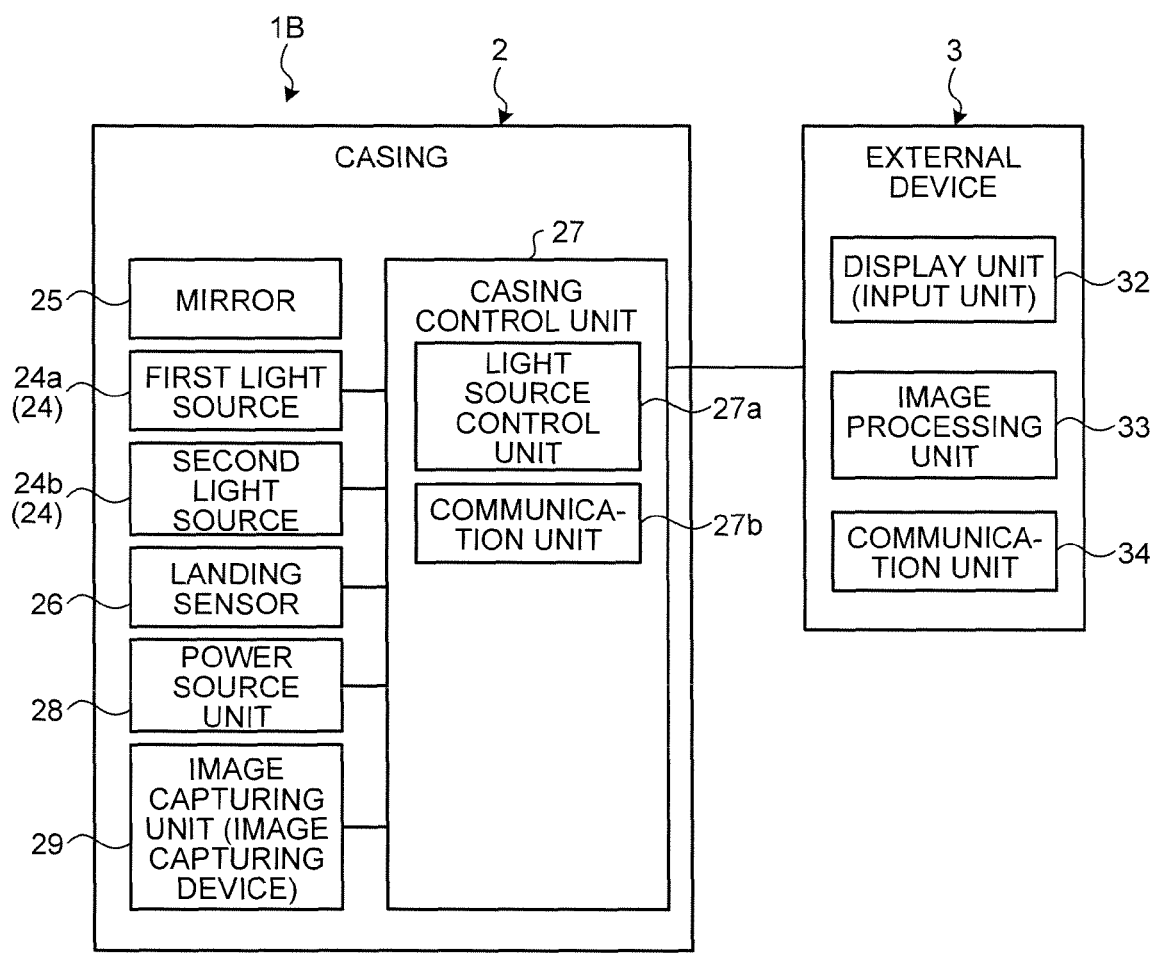
FIG. 12 is a diagram illustrating a schematic configuration example of the image reading apparatus according to the second embodiment.

Descriptions will now be made to an image reading apparatus according to a second embodiment. FIG. 11 is an external view of the image reading apparatus according to the second embodiment. FIG. 12 is a diagram illustrating a schematic configuration example of the image reading apparatus according to the second embodiment. An image reading apparatus 1B according to the second embodiment differs from the image reading apparatus 1A according to the first embodiment, in an aspect that a casing 2 (instead of an external device 3) has an image capturing unit 29, as illustrated in FIG. 11 and FIG. 12. The basic configuration of the image reading apparatus 1B is substantially the same as that of the image reading apparatus 1A, and thus the same reference numerals will not be or only simply be described.

In the casing 2, a holder portion 23 for accommodating the external device 3 is not formed, and so the external device 3 is not attachable to the casing 2. In this embodiment, the casing 2 differs from the casing 2 of this first embodiment, and the image capturing unit 29 is fixed thereto and so is not attachable/detachable thereto/therefrom.

The image capturing unit 29 is to capture the image of the medium P exposed to the casing internal portion 21f in an opening portion 22. The image capturing unit 29 is arranged in the position substantially equal to the position of the image capturing unit 31 with respect to the casing 2 of the external device 3 accommodated in the holder portion 23 in the first embodiment, and is to capture an image of the opening portion 22 through a mirror 25.

In this embodiment, the communication unit 27b sends an image signal output from an image capturing unit 29. A communication unit 34 is to receive the image signal sent from the communication unit 27b.

The external device 3 is configured to include at least a display unit 32, an image processing unit 33, the communication unit 34, a power source unit which is not illustrated, and a storage unit which is not illustrated. In this case, the external device 3 may have an image capturing unit. That is, as the image capturing unit configuring the image reading apparatus 1B, the image capturing unit 29 of the casing 2 is used.

Figure 13:
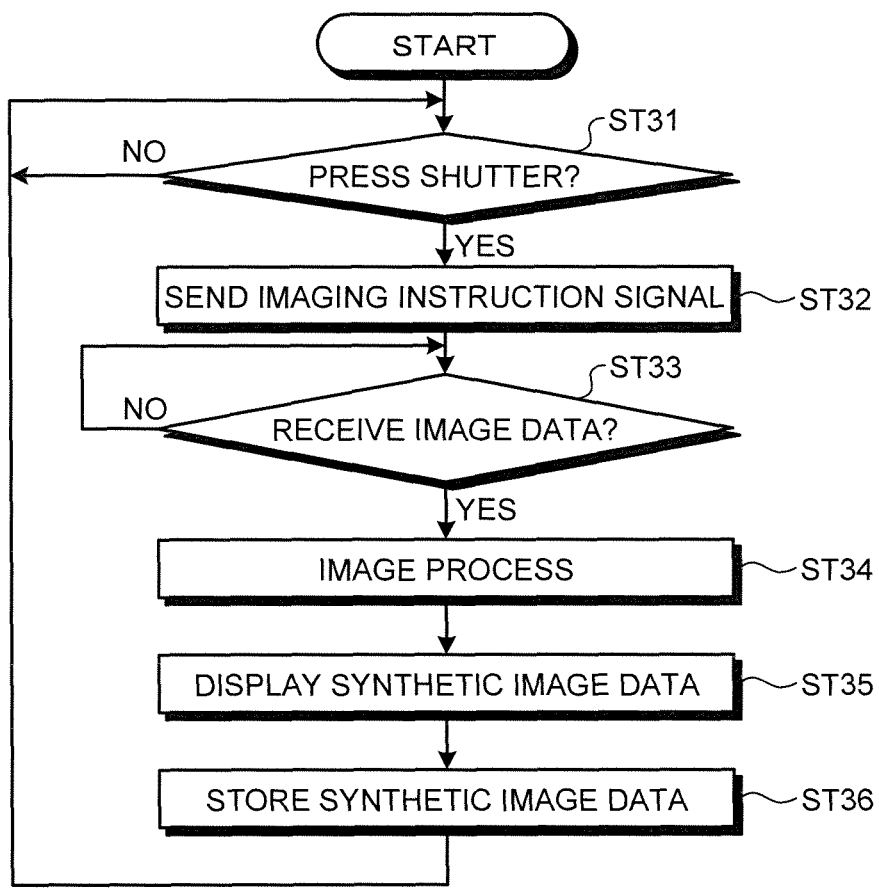
FIG. 13 is a flowchart of a reading operation of the image reading apparatus according to the second embodiment.
Figure 14:
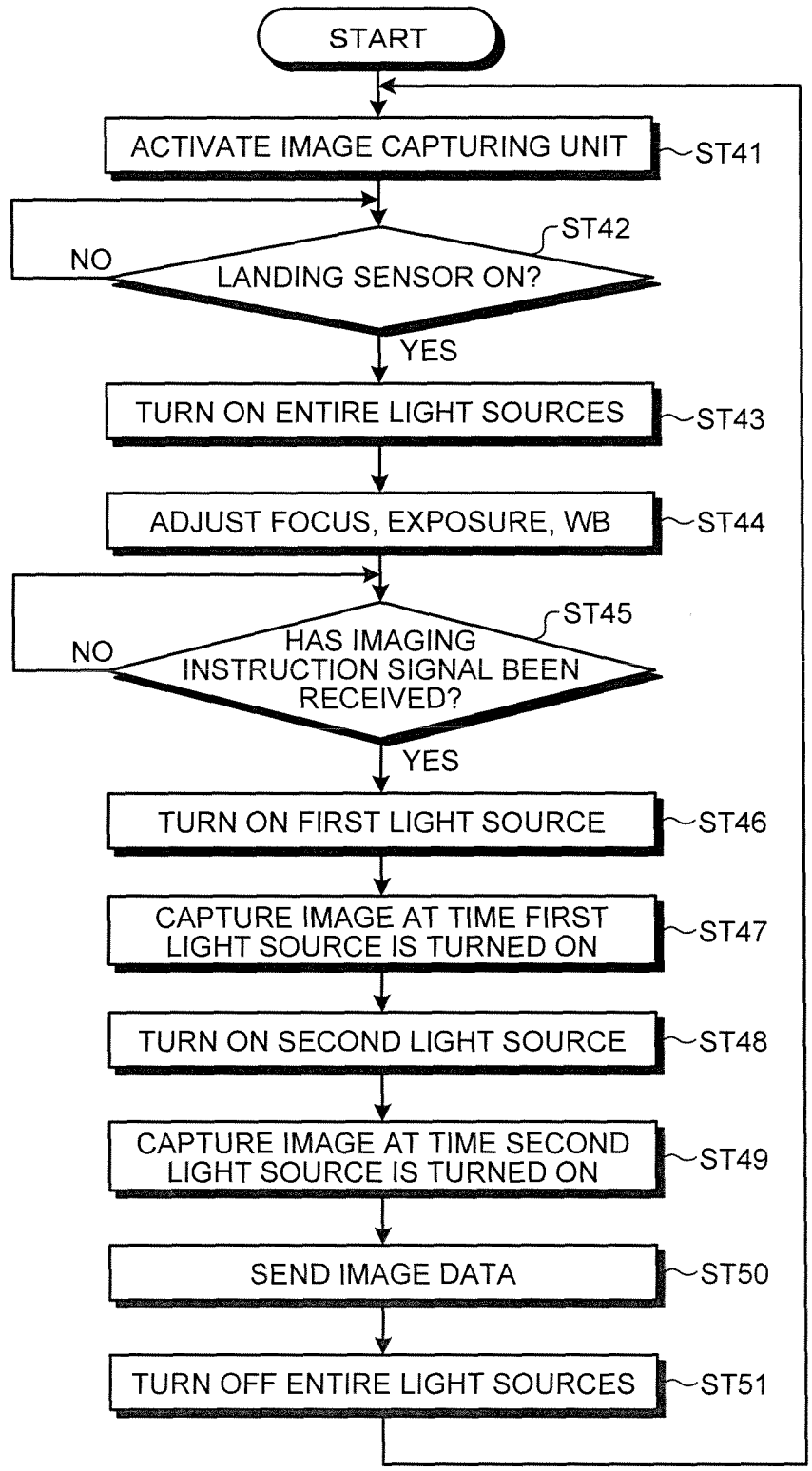
FIG. 14 is a flowchart of a reading operation of the image reading apparatus according to the second embodiment.

Descriptions will now be made to the reading of the medium P performed by the image reading apparatus 1B according to this embodiment. FIG. 13 is a flowchart of a reading operation of the image reading apparatus according to the second embodiment. FIG. 14 is a flowchart of a reading operation of the image reading apparatus according to the second embodiment. The reading of the medium P, performed by the image reading apparatus 1B, is executed in a state where the external device 3 is not attached to the casing 2. The basic operation of the image reading apparatus 1B is substantially the same as the basic operation of the image reading apparatus 1A, thus the same reference numerals will not be described or only simply be described.

In the casing 2, the image capturing unit 29 is activated based on a user instruction for executing a reading application of the external device 3, as illustrated in FIG. 14 (Step ST41). In response to the user instruction for executing the reading application, the external device 3 sends an execution instruction signal to the image capturing unit 29 of the casing 2 through the communication unit 34 and the communication unit 27b. As a result, the image capturing unit 29 which has received the execution instruction signal is activated, and continues to perform capturing the image of the opening portion 22. Then, image data generated by the image capturing unit 29 is output sequentially to the display unit 32 through the communication unit 27b and the communication unit 34, and the images based on the generated image data are sequentially displayed by the display unit 32. At this time, the plurality of light sources 24 are in a turned-off state. The external device 3 repeats to determine whether the shutter has been pressed (Step ST31) until the shutter is pressed, and stands by until the shutter is pressed. The casing control unit 27 repeats determining whether a landing sensor 26 is turned ON (Step ST42) until the landing sensor 26 is ON, and stands by until the landing sensor 26 is ON.

When the user closely contacts the casing 2 to the medium P, the casing control unit 27 determines that the landing sensor 26 is ON (Step ST42 Yes), and turns on the entire light sources (Step ST43). As a result, the display unit 32 displays the image captured by the image capturing unit 29, in a state where the plurality of light sources 24 are turned on.

The casing 2 adjusts the focus, exposure, and white balance (WB) (Step ST44). The image capturing unit 29 sets an image capturing condition of the image capturing unit 29 in conformity with the environment of the casing internal portion 21f, thereby performing the above adjustments. The light source control unit 27a repeats determining whether an imaging instruction signal has been received (Step ST45) until an imaging instruction signal (described later) is received, and stands by until the imaging instruction signal is received.

As illustrated in FIG. 13, when the user presses the shutter of the display unit 32, the external device 3 determines that the shutter has been pressed (Step ST31 Yes), and sends an imaging instruction signal (Step ST32). The image processing unit 33 repeats determining whether the image data has been received (Step ST33) until image data (described later) is received, and stands by until the image data is received.

When the casing 2 receives the imaging instruction signal (Step ST45 Yes), it turns on only the first light source 24a (Step ST46). In this case, after the light source control unit 27a once turns off the first light source 24a and the second light source 24b, it turns on only the first light source 24a. At the time of turning on only the first light source 24a, the casing 2 performs capturing the image using the image capturing unit 29 (Step ST47). The image capturing unit 29 in this embodiment generates first image data D1 with reflection Pa corresponding to the first light source 24a.

The casing 2 turns on only the second light source 24b (Step ST48). After the light source control unit 27a turns off the first light source 24a, it turns on only the second light source 24b. At the time of turning on only the second light source 24b, the casing 2 performs capturing the image using the image capturing unit 29 (Step ST49). The image capturing unit 29 in this embodiment generates second image data D2 with reflection Pb corresponding to the second light source 24b.

The casing 2 sends the image data (Step ST50). In this case, the image capturing unit 29 sends both of the generated image data D1 and D2 to the image processing unit 33 through the communication unit 27b and the communication unit 34. The casing 2 turns off all of the plurality of light sources 24 (Step ST51). In this case, the light source control unit 27a turns off the lighted second light source 24b.

When the external device 3 receives image data (Step ST33 Yes), it performs an image process (Step ST34). In this case, the image processing unit 33 performs similar image process as that of the first embodiment, and mainly performs the generation of synthetic image data DG and correction of the synthetic image data DG. The external device 3 displays an image based on the synthetic image data DG on the display unit 32 (Step ST35). The external device 3 stores the synthetic image data DG (Step ST36).

As described above, the image reading apparatus 1B according to this embodiment can reduce damage on the medium P, easily convert the image on the medium P into image data, and generate high quality image data. Because the casing 2 has the image capturing unit 29, there is no need to use the image capturing unit of the external device 3. That is, the image capturing unit of the external device 3 is not necessarily exposed to the casing internal portion 21f, and the medium P can be read in a state where the casing 2 and the external device 3 are separated. Thus, no limitation is imposed on the external device 3 which can be used as the image reading apparatus 1B, in an aspect of its shape or the position of the image capturing unit. Thus, various kinds of external devices can be used as the external device 3 of the image reading apparatus 1B.

In the above descriptions, in the first and second embodiments, the information is sent/received between the casing 2 and the external device 3, through the communication unit 27b and the communication unit 34. However, this information transmission is not limited to this. As long as the information is sent/received between the casing 2 and the external device 3, the casing 2 and the external device 3 may be electrically connected through a signal line, that is, may be connected through wired connection. In addition, it may be performed through acoustic communication which uses a sound, such as an ultrasonic wave band or vibration detection which is performed with a combination of a vibration generator such as an eccentric motor and a vibration receiver such as an acceleration sensor.

Third Embodiment

Figure 15:
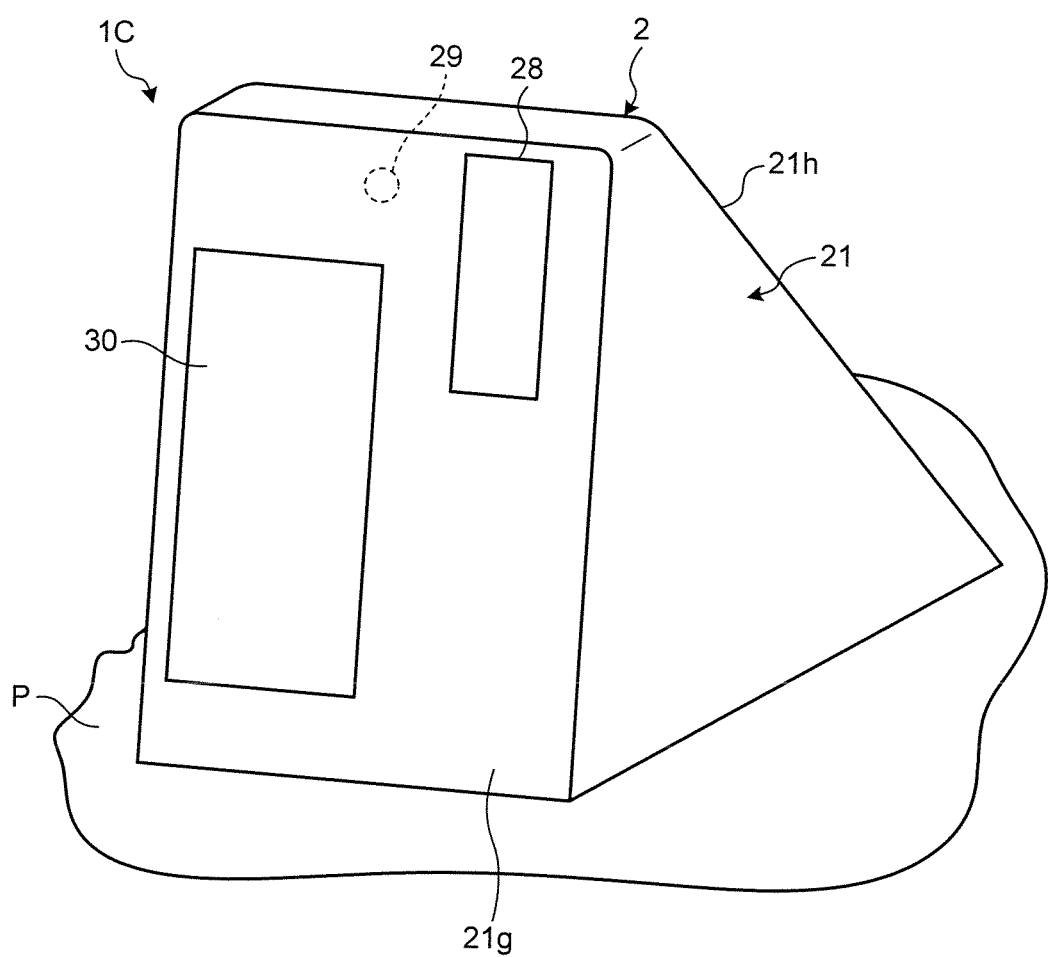
FIG. 15 is an external view of an image reading apparatus according to a third embodiment.
Figure 16:
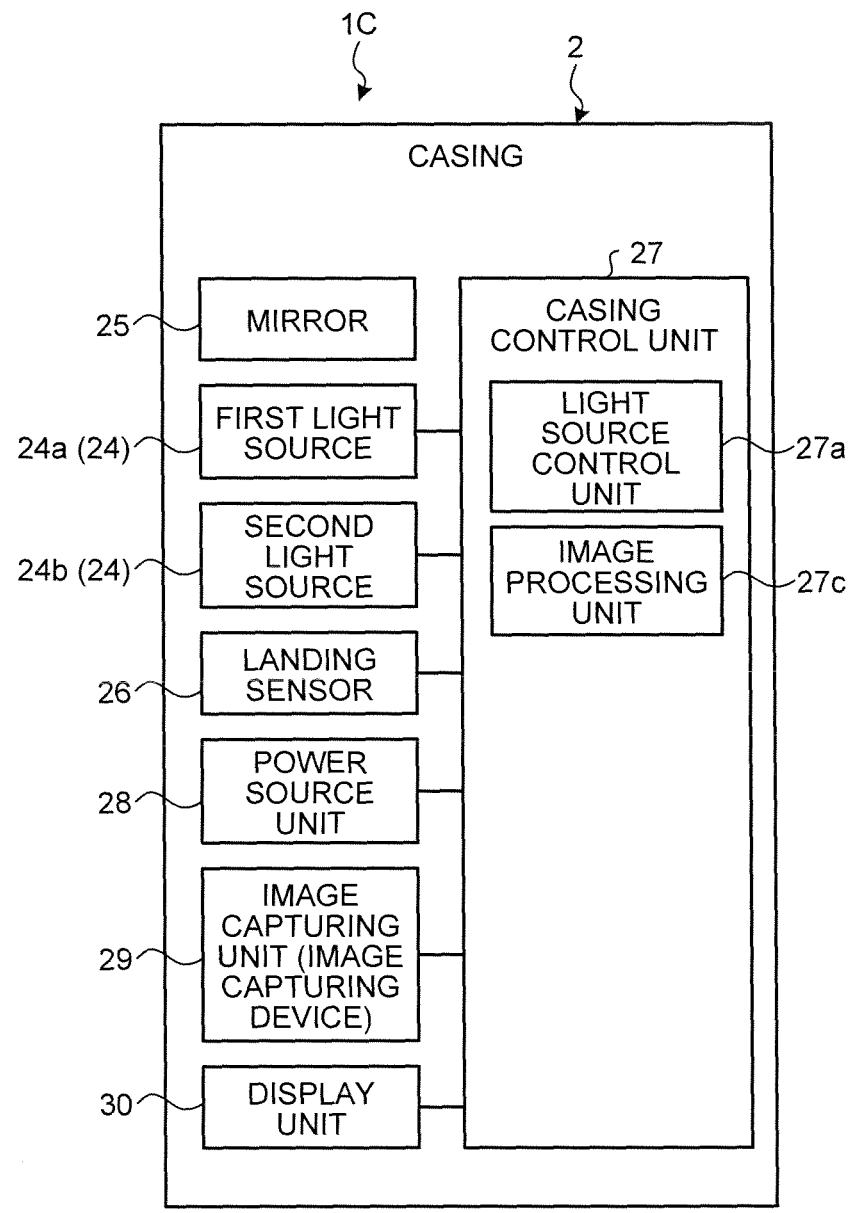
FIG. 16 is a diagram illustrating a schematic configuration example of the image reading apparatus according to the third embodiment.

Descriptions will now be made to an image reading apparatus according to a third embodiment. FIG. 15 is an external view of the image reading apparatus according to the third embodiment. FIG. 16 is a diagram illustrating a schematic configuration example of the image reading apparatus according to the third embodiment. As illustrated in FIG. 15 and FIG. 16, an image reading apparatus 1C according to the third embodiment differs from the image reading apparatus 1A according to the first embodiment in aspects that it does not have an external device 3 and that a casing 2 has an image capturing unit 29 and a display unit 30. The basic configuration of the image reading apparatus 1C is substantially the same as the basic configuration of the image reading apparatus 1A, and thus the same reference numerals will not be described or only simply be described.

The casing 2 is different from the casing 2 in the first embodiment. The image capturing unit 29 and the display unit 30 are fixed thereto and so are not attachable/detachable thereto/therefrom.

The image capturing unit 29 is provided to capture the image of a medium P exposed to a casing internal portion 21f in an opening portion 22. The image capturing unit 29 is arranged in a position substantially the same as the position with respect to the casing 2 of the image capturing unit 31 of the external device 3 accommodated in the holder portion 23 in the first embodiment, and captures the image of the opening portion 22 through the mirror 25.

A display unit 30 displays the image of the medium P captured by the image capturing unit 29. The display unit 30 is arranged on an inclined surface 21g, and can be seen from the external side of the casing 2.

An image processing unit 27c is included in a casing control unit 27 as a function thereof, and is to process image data corresponding to the medium P captured by the image capturing unit 29.

Figure 17:
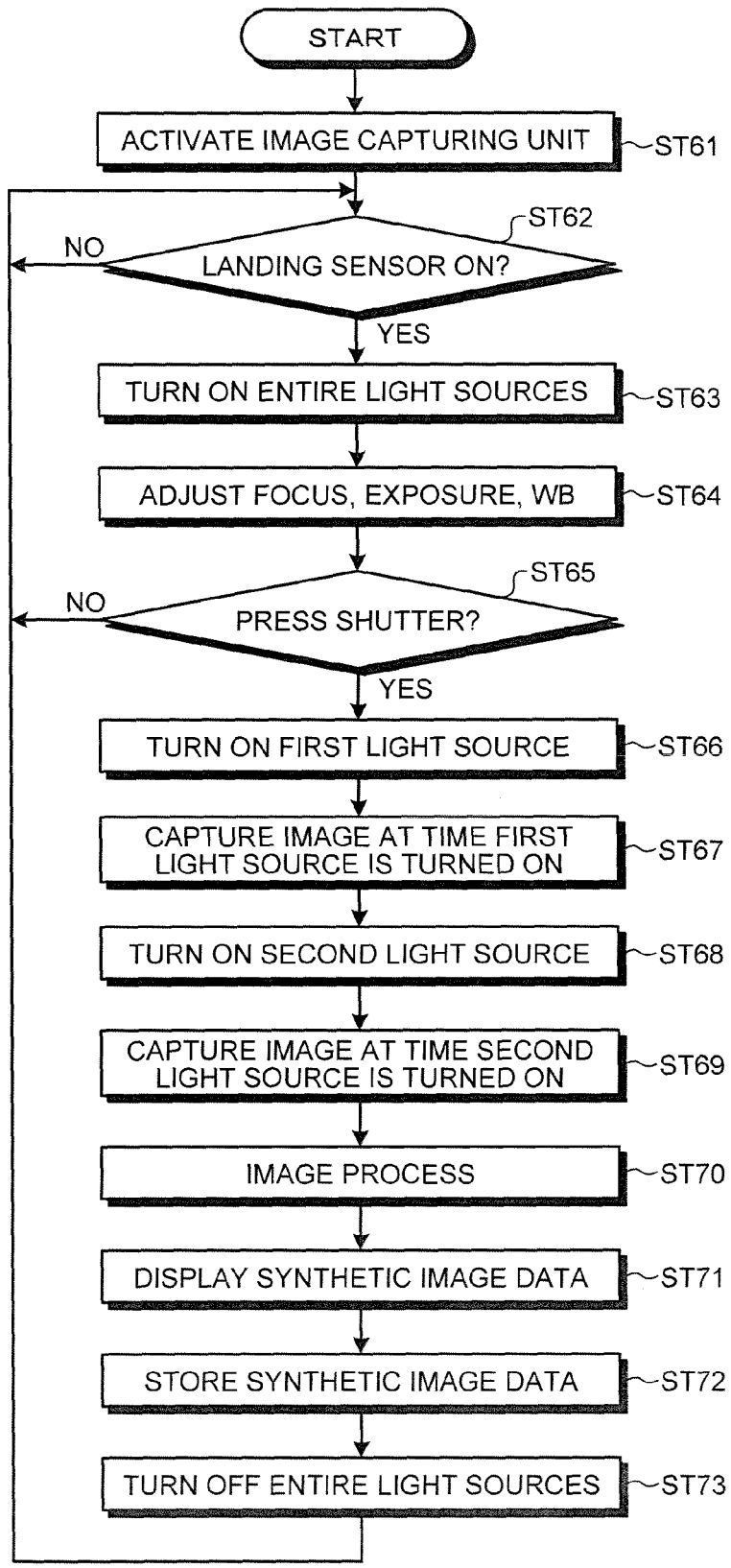
FIG. 17 is a flowchart of a reading operation of the image reading apparatus according to the third embodiment.

Descriptions will now be made to the reading of the medium P using the image reading apparatus 1C according to this embodiment. FIG. 17 is a flowchart of a reading operation of the image reading apparatus according to the third embodiment. The reading of the medium P using the image reading apparatus 1B is performed in the casing 2. The basic operation of the image reading apparatus 1B is substantially the same as the basic operation of the image reading apparatuses 1A and 1B, and thus the same reference numerals will not be described or only simply be described.

As illustrated in FIG. 17, in the casing 2, the image capturing unit 29 is activated, in response to a user instruction for executing a reading application (Step ST61). The image capturing unit 29 is activated, and continues to capture the image of the opening portion 22. Then, image signals are sequentially output to the image processing unit 27c, and the image processing unit 27c sequentially generates image data. Those images based on the generated image data are sequentially displayed on the display unit 30. At this time, a plurality of light sources 24 are in a turned-off state. The casing control unit 27 repeats determining whether the landing sensor 26 is ON (Step ST62) until the landing sensor 26 is ON, and stands by until the landing sensor 26 is ON.

If the user closely contacts the casing 2 to the medium P, the casing control unit 27 determines that the landing sensor is ON (Step ST62 Yes), and turns on all of the entire light sources (Step ST63). As a result, the display unit 30 displays an image captured by the image capturing unit 29 in a state where the plurality of light sources 24 are turned on.

The casing 2 adjusts the focus, exposure, and white balance (WB) (Step ST64). The image processing unit 27c sets an image capturing condition of the image capturing unit 29 in conformity with an environment of the casing internal portion 21f, thereby performing the adjustments. When the user presses a shutter of the display unit 30, the casing 2 determines that the shutter has been pressed (Step ST65 Yes), and turns on only the first light source 24a (Step ST66). The casing 2 performs capturing the image using the image capturing unit 29 at the time only the first light source 24a is turned on (Step ST67). The casing 2 turns on only the second light source 24b (Step ST68). The casing 2 performs capturing the image using the image capturing unit 29, at the time of turning on only the second light source 24b (Step ST69). In this case, the image processing unit 27c generates the both image data D1 and D2.

The casing 2 performs an image process (Step ST70). The image processing unit 27c performs similar image process as that of the first embodiment, and mainly performs the generation of synthetic image data DG and correction of synthetic image data DG. The casing 2 displays images based on the synthetic image data DG on the display unit 30 (Step ST71). The casing 2 stores the synthetic image data DG (Step ST72). The casing 2 turns off all of the plurality of light sources 24 (Step ST73).

Accordingly, the image reading apparatus 1C according to this embodiment can reduce damage on the medium P, easily convert the image on the medium P into image data, and generate high quality image data. Because the casing 2 has the image capturing unit 29 and the display unit 30, the external device 3 is not necessary. The casing 2 can read the medium P, by itself.

In the above-described third embodiment, in order to externally send the stored synthetic image data DG, a communication unit 27b may be included, like the above-described first and second embodiments. A slot that can electrically connect to a recording medium may be included.

The casing 2 according to the first to third embodiments has the power source unit 28. However, electric power may be supplied to each of the units of the casing 2, from an external electric power source outside the casing 2. The external electric power source may include a commercial power source, a solar power system, and the power source unit installed on the external device 3.

The first light source 24a and the second light source 24b in the above first to third embodiments are respectively provided on the pair of opposite internal side surfaces 21a and 21b. However, they are not limited to this, as long as the opposed main irradiation areas La and Lb do not overlap with each other. By adjusting the respective optical axes of the first light source 24a and the second light source 24b, their installation height can be changed, or the installation can be made parallel at the same height, on the same surface (internal side surfaces 21a and 21b, and exposing surface 21c), for example. By changing the optical axes of the plurality of light emitting devices included in the light source 24, the main irradiation areas La and Lb that do not overlap with each other by one light source 24 may be realized.

In the above first to third embodiments, the descriptions have been made to the case where the plurality of light sources 24 include two light sources. However, three or more light sources may be included, as long as light can be irradiated into different areas on the plane in the opening portion 22. In this case, the image capturing units 29 and 31 capture the image of the medium P exposed to the casing internal portion 21f in the opening portion 22, every time each light source is turned on. Thus, the number of image data items to be generated is the number of light sources. The image processing units 27c and 33 extract an area without reflection occurrence from each image data, to generate synthetic image data DG. In the first to third embodiments, the descriptions have been made to the case in which only one of the plurality of light sources 24 is turned on, every time capturing the image is performed by the image capturing units 29 and 31. However, the plurality of light sources may be turned on at the same time, as long as light can be irradiated to different areas on the plane in the opening portion 22. In the above descriptions, although the plurality of light sources 24 are all turned on, at least one light source may be turned on.

The image reading apparatus according to the present invention reduces damage on a medium and easily convert the image on the medium into image data, thus enabling to generate high quality image data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
a casing that blocks ambient light and has an opening portion in a bottom surface;
an image capturing unit that captures an image of a medium exposed to an internal portion of the casing in the opening portion;
a plurality of light sources each of which includes a plurality of light emitting devices, the plurality of light sources being arranged on the internal portion of the casing and emitting light toward the opening portion; and
an image processing unit included in an external device and configured to generate a synthetic image including the image of the medium based on images from the image capturing unit, wherein
the plurality of light sources irradiate respective irradiation areas with light, the irradiation areas including first and second irradiation areas different from each other on a plane in the opening portion,
when only first one of the plurality of light sources is turned on to irradiate the first irradiation area with light, the image capturing unit captures the image of the medium to generate a first image including a reflection area corresponding to an area within the first irradiation area where reflection occurs,
when only second one of the plurality of light sources is turned on to irradiate the second irradiation area with light, the image capturing unit captures the image of the medium to generate a second image including a reflection area corresponding to an area within the second irradiation area where reflection occurs, and
the image processing unit is configured to synthesize the first image with the second image to generate the synthetic image from which the reflection areas are extracted.

2. The image reading apparatus according to claim 1, wherein
the image capturing unit is configured to capture the image of the medium continuously for a plurality of times, and
at least one light source in the plurality of light sources, which is different from a light source which is turned on at time of capturing the image previously, is turned on, every time the image capturing unit captures the image.

3. The image reading apparatus according to claim 1, further comprising a display unit which displays the image of the medium captured by the image capturing unit.

4. The image reading apparatus according to claim 3, further comprising
a block detection unit which detects whether the opening portion has been blocked, wherein
at least one of the plurality of light sources is turned on, when it is detected that the opening portion has been blocked, and
the display unit displays the image of the medium which is captured in a turned-on state.

5. The image reading apparatus according to claim 1, wherein the image capturing unit is attachable/detachable to/from the casing.

6. The image reading apparatus according to claim 3, wherein the display unit is installed on an external device which is different from the casing.

7. The image reading apparatus according to claim 1, wherein
the casing has a space, which is formed between an exposing surface for exposing the image capturing unit to the internal portion of the casing and an opposed surface opposed to the exposing surface and expands toward the opening portion,
a mirror is arranged on the opposed surface, and
the image capturing unit captures the image of the medium through the mirror.

* * * * *